3,380,915
PROCESS FOR DESULFURIZATION WITH
REGENERABLE SALTS OF WEAK ACIDS
William J. Mattox and William F. Arey, Jr., Baton Rouge,
La., assignors to Esso Research and Engineering Company, a corporation of Delaware
No Drawing. Filed Sept. 29, 1965, Ser. No. 491,381
4 Claims. (Cl. 208—284)

ABSTRACT OF THE DISCLOSURE

Petroleum residua are desulfurized by contacting with a treating agent comprising an alkali metal salt of a weak, nonvolatile acid. Alkali metal salts which may be employed for this purpose include the aluminates, antimonates, arsenates, arsenites, molybdates, stannates, silicates, tungstates, vanadates, etc. The salts are regenerable from the spent reagent by fusion of the alkali metal carbonate and alkali metal sulfide therein with the oxide corresponding to the acid anion of said weak acids.

---

This invention relates to a process for the removal of sulfur from liquid hydrocarbon streams, particularly petroleum residua. More specifically, the invention relates to the desulfurization of petroleum residua with certain regenerable salts of weak acids.

Generally, sulfur occurs in petroleum stocks in one of the following forms: mercaptans, sulfides, disulfides, and as part of a more or less substituted ring, of which thiophene, benzothiophene, and dibenzothiophene are the prototypes. The mercaptans are generally found in the lower boiling fractions, e.g., naptha, kerosene, and light gas oil. Numerous processes for sulfur removal from these lower boiling fractions have been suggested, such as "doctor" sweetening (wherein mercaptans are converted to disulfides), caustic treating, solvent extraction, copper chloride treating, and so forth, all of which give a more or less satisfactory decrease in sulfur or in deactivation of mercaptans by their conversion into disulfides. When the process results in the latter effect, the disulfides generally remain in the treated product and must be removed by another step if it is desired to obtain a sulfur-free product.

Sulfur removal from higher boiling fractions, however, has been a much more difficult operation. Here, the sulfur is present for the most part in the less reactive forms as sulfides, disulfides, and as a part of a ring compound, such as substituted thiophenes. Said sulfur, of course, is not susceptible to chemical operations satisfactory for removal of mercaptans. Extraction processes employing sulfur-selective solvents are also unsatisfactory because the high boiling fractions contain a much higher percentage of sulfur-containing molecules; for example, even if a residuum contains only about 3% sulfur, it is estimated that substantially all the molecules may contain sulfur. Thus, if such a residuum were extracted with a solvent selective to sulfur compounds, the bulk of the residuum would be extracted and lost.

A process for the chemical desulfurization of residuum stocks employing fused alkali metal hydroxides has been disclosed by Mattox in U.S. Patent 3,164,545, issued January 5, 1965. While contaminant removal is excellent using fused alkali metal hydroxides, the process suffers from the inherent defect that the treating agent becomes spent and it must be regenerated in a multi-step regeneration sequence.

The object of this invention is to provide a process for the desulfurization of residuum in which regeneration can be achieved by a single regeneration step in a simple and straightforward manner. We have found that certain regenerable salts of weak acids are effective chemical desulfurization reagents.

The invention will be further illustrated by the following description and examples.

Generally speaking, the process involves contacting the oil at elevated temperature with an alkali metal salt of a weak acid and regenerating the sulfide, hydrosulfide and/or carbonate of the alkali metal formed in the desulfurization step by fusion with the corresponding metal oxide or in some instances by slurrying the oxide in an aqueous solution of the carbonate and/or the sulfide.

The desulfurization feedstock comprises a heavy hydrocarbon oil containing an appreciable quantity of sulfur compounds, i.e., from about 0.5 to 10.0 wt. percent sulfur. Specific examples include heavy whole crude oils, topped crude oils, deasphalted oils, atmospheric residua, shale oils, and the like. Petroleum residua having an initial boiling point above about 600° F. are preferred feeds.

The petroleum residuum is contacted in any suitable reaction vessel, preferably a vessel lined with a corrosion resistant material. Reaction conditions include temperatures ranging from 300–1000° F., preferably 500–800° F. Sub-atmospheric pressures can be used but elevated pressures, i.e., 14–2000 p.s.i., are preferred. The quantity of salt will range from 10–200 wt. percent based on the oil feed. Contacting times range up to 20 hours. Continuous or batch contacting can be used.

The amount of water associated with the salt is important. The water content should be within the range of from about 3–30 wt. percent based on the salt.

A large number of alkali metal salts of weak, nonvolatile acids are available and are suitable for use in this process. By weak, nonvolatile acids we mean acids (1) having acidities approximately the same or less than carbonic acid and (2) being of a nature wherein the oxide or sulfide corresponding to the acid anion is not gaseous at temperatures below 1000° F. The following salts are illustrative: aluminates ($KAlO_2$), antimonates ($KSbO_2$), $KSbO_3$, $K_4Sb_2O_7$, $KH(SbO_3)_2$, $K_2H_2Sb_2O_7$, $KSb(OH)_6$, arsenates and arsenites ($K_3AsO_4$, $KAsO_3$, $KH_2AsO_4$, $KAsO_2$, $K_3AsO_3$, $KAsO_2 \cdot HAsO_2$), manganate ($K_2MnO_4$), molybdates ($K_2MoO_4$), osmates ($K_2OsO_4$), plumbates ($K_2PbO_3$, $K_2Pb(OH)_6$), silicates ($K_4SiO_4$, $K_2SiO_3$, $K_2Si_2O_5$), stannates ($K_2SnO_3$, $K_2Sn(OH)_6$), tellurates and tellurites ($K_2TeO_4$, $K_2TeO_3$), tungstates ($K_2WO_4$), uranates ($K_2UO_4$, $K_2U_2O_7$), vanadates ($KVO_3$), etc.

The reaction may be improved by passing air or oxygen into the reactor during the desulfurization or by preoxidizing the petroleum feedstock. Air rates of 1–1500 standard cubic feet per barrel can be used. If the feedstock is preoxidized, contacting temperatures ranging from 200–800° F. and contacting times ranging from 10 minutes to 10 hours are suitable.

The alkali metal salts of weak nonvolatile acids are readily prepared from the carbonates or the sulfides of the particular alkali metal involved and the appropriate metal oxide or silica by fusion at about 700–1200° F. or, in some instances, such as with the molybdates, merely by contacting an aqueous slurry. The preparation of potassium silicate is shown by the following formula:

$$K_2S + K_2CO_3 + 2SiO_2 + H_2O \xrightarrow{900-1200° F.} 2K_2SiO_3 + CO_2 + H_2S$$

Desulfurization with potassium silicate can be illustrated by the following reactions at 600–650° F.:

(1) $K_2SiO_2 + H_2O \rightarrow 2KOH + SiO_2$.
(2) $KOH + $ High S Oil Feed$\rightarrow$Low S Oil
    $+ K_2S + K_2CO_3$ Potassium silicate, potassium stannate, potassium molybdate, potassium meta-antimonate, and potassium aluminate have shown about 20–30% sulfur removal from West Texas deasphalted oil at 600–650° F. The following tabulation shows the results of the desulfurization with a selected group of alkali metal salts of weak acids.

TABLE I.—DESULFURIZATION OF WEST TEXAS DEASPHALTED OIL WITH ALKALI METAL SALTS; FOUR-HOUR TREATS; 600–650° F.; 0.5–1.1 SALT/OIL WT. RATIOS

| Salt | Percent water on Reagent | Pressure, p.s.i.g. | Percent Desulf. | Percent Desulf. with Equivalent Amount of Fused KOH, Correlated Data |
|---|---|---|---|---|
| $K_2Si_2O_5$ | 100 | 397 | 22 | 21 |
| $K_2SnO_3$ | 48 | 560 | 19 | 17 |
| $K_2MoO_4$ | 0 | 0 | 20 | 12 |
| $KSbO_3$ | 3 | 140 | 33 | 18 |
| $K_4Sb_2O_7$ | 18 | 730 | 7 | 24 |
| $K_2H_2Sb_2O_7$ | 17 | 345 | 12 | 18 |
| $K_2B_4O_7$ | 20 | 520 | 6 | 28 |
| $KVO_3$ | 18 | 200 | 12 | 24 |
| $K_2Al_2O_3$ | 20 | 55 | 23 | 33 |
| $Na_2Al_2O_3$ | 30 | 430 | 23 | -- |

Data obtained in these tests, particularly with the silicate and meta-antimonate, show the necessity for adding appropriate quantities of water. These amounts presently appear to be within the range of about 3–30 wt. percent based on the weight of the salt used and vary with the salt. Summarized effects of water ratios on desulfurization with the silicate and meta-antimonate are shown below.

TABLE II.—DESULFURIZATION OF PREOXIDIZED WEST TEXAS OIL WITH K-SILICATE AND WITH $KSbO_3$; 4-HOUR TREATS

| K-Salt | Weight Percent Salt on Oil | Water Ratio | | Percent Desulfurization |
|---|---|---|---|---|
| | | Weight Percent on Salt | Mols/ Mol K | |
| Antimonate | 98 | 0 | 0 | 10 |
| Do | 98 | 3 | 0.4 | 30–33 |
| Do | 98 | 18 | 2.1 | 20 |
| Do | 98 | 43 | 5.0 | 12 |
| Silicate | 164 | 0 | 0 | 10 |
| Do | 100 | 15 | 0.9 | 22 |
| Do | 100 | 30 | 1.8 | 11 |

It has also been ascertained that multi-stage treatments optimize conversion and the beneficial effects are shown below:

TABLE III.—DESULFURIZATION OF WEST TEXAS DE-ASPHALTED OIL WITH $KSbO_3$ AT 650° F.

| No. of Stages in treat | 1 | 1 | 1 | 2 |
|---|---|---|---|---|
| Percent $KSbO_3$ on oil, total | 49 | 98 | 195 | 200 |
| Percent Desulfurization | 15 | 30–33 | 31 | 44 |

Oxygen promotion has a very pronounced effect on desulfurization with these salts, as illustrated with potassium antimonate.

TABLE IV.—EFFECTS OF OXYGEN PROMOTION ON K-SALT DESULFURIZATION: 650° F.; 4-HOUR TREATS; 1/1 RATIO $KSbO_3$/W. TEXAS OIL

| Feed Pretreat | Percent $H_2O$ on Reagent | Percent S Removal |
|---|---|---|
| None | 3 | 10 |
| Preoxidized | 3 | 30–33 |

As the desulfurization reaction proceeds the treating agent becomes spent and $K_2S$ and $K_2CO_3$ are formed when the potassium salt is used. Potassium silicate is regenerated by carrying out the following reaction at 900–1200° F. and pressures ranging from 1–200 p.s.i.a.

$$K_2S + K_2CO_3 + 2SiO_2 \rightarrow 2K_2SiO_3 + CO_2 + H_2S$$

Similar alkali metal salts of weak acids can be regenerated by the same method. Certain salts such as the molybdates can be regenerated by contacting in an aqueous slurry, as follows:

$$MoO_3 + H_2O \rightarrow H_2MoO_4$$

$$H_2MoO_4 + K_2CO_3 \rightarrow K_2MoO_4 + H_2O + CO_2$$

The foregoing description and examples clearly show the advantages of alkali metal salts of weak non-volatile acids for desulfurization of heavy oils.

What is claimed is:
1. The process for removing sulfur impurities from petroleum residua containing 0.5 to 10.0 wt. percent sulfur and having an initial boiling point above about 600° F. which comprises continuously contacting the residua at a temperature in the range of 500–800° F. with a treating agent comprising an alkali metal salt of a weak, non-volatile acid having an acidity equal to or less than carbonic acid and 3–30 wt. percent water based on the salt and recovering desulfurized petroleum residua.

2. The process of claim 1 wherein the feed is peroxidized prior to said contacting.

3. The process of claim 1 wherein the alkali metal salt is selected from the group consisting of potassium silicate, potassium stannate, potassium molybdate, potassium meta-antimonate and potassium aluminate.

4. The process of removing sulfur impurities from petroleum residua containing 0.5 to 10.0 wt. percent sulfur and having an initial boiling point above about 600° F. which comprises continuously contacting the residua at a temperature in the range of 300° to 1000° F., with a treating agent comprising an alkali metal salt of a weak, non-volatile acid having an acidity equal to or less than carbonic acid and containing 3–30 wt. percent water based on the total reagent, separating desulfurized oil from spent reagent, regenerating said spent reagent comprising alkali metal carbonate and alkali metal sulfide by fusion with the oxide corresponding to the acid anion of said acid and passing the regenerated reagent to the contacting zone.

References Cited

UNITED STATES PATENTS

| 1,540,218 | 6/1925 | Maloney | 208—285 |
| 1,927,182 | 9/1933 | Morrell | 208—191 |
| 1,942,054 | 1/1934 | Garrison | 208—226 |
| 2,124,814 | 7/1938 | Stagni | 208—284 |
| 2,434,868 | 1/1948 | Sample et al. | 208—230 |
| 2,944,016 | 7/1960 | Thomas | 208—284 |
| 3,152,070 | 10/1964 | Lehman et al. | 208—285 |
| 3,164,545 | 1/1965 | Mattox | 208—230 |

DELBERT E. GANTZ, *Primary Examiner.*

G. J. CRASANAKIS, *Assistant Examiner.*